United States Patent [19]

Stroze et al.

[11] Patent Number: 4,932,435

[45] Date of Patent: Jun. 12, 1990

[54] MULTI-STAGE FLOW REGULATING VALVE

[75] Inventors: Mark S. Stroze; Shan-Chin Tsai, both of Rockford, Ill.

[73] Assignee: Sundstrand Corporation, Rockford, Ill.

[21] Appl. No.: 380,882

[22] Filed: Jul. 17, 1989

[51] Int. Cl.⁵ ............................................. F16K 17/00
[52] U.S. Cl. ................................. 137/504; 137/513.3; 137/517; 137/529; 137/614.16
[58] Field of Search ................... 137/513.3, 529, 517, 137/614.16, 504

[56] References Cited

U.S. PATENT DOCUMENTS

| | | | |
|---|---|---|---|
| 3,170,481 | 2/1965 | Presnell | 137/513.3 |
| 3,399,692 | 9/1968 | Hebert | 137/492.5 |
| 3,464,439 | 9/1969 | Budzich | 137/504 |
| 3,672,167 | 6/1972 | Griesenbrock | 180/66 |
| 3,794,077 | 2/1974 | Fanshier | 137/513.3 |
| 3,872,884 | 3/1975 | Busdiecker et al. | 137/504 |
| 4,279,268 | 7/1981 | Aubert | 137/115 |
| 4,437,493 | 3/1984 | Okuda et al. | 137/504 |

*Primary Examiner*—A. Michael Chambers
*Attorney, Agent, or Firm*—Wood, Phillips, Mason, Recktenwald & VanSanten

[57] ABSTRACT

The problem of controlling overspeed and/or oscillation of a variable displacement hydromechanical actuation system is solved by a multi-stage flow regulating valve (18) which includes a valve body (20, 22) having a fluid inlet (24) and a fluid outlet (26) defining a flow path (A,B) through the valve body. A first stage valve piston (30) is reciprocally mounted within a cylinder (28) in the valve body (20) in the flow path between the inlet and the outlet for restricting fluid flow in response to a first range of incoming fluid pressure. The first stage piston (30) has an inlet orifice (34) exposed to the incoming fluid and an outlet port (36) in registry with the outlet (26) of the valve body (20). A second stage valve piston (44) is reciprocally mounted within the first stage piston (30) and has an orifice plate (46) for covering the inlet orifice (34) of the first stage valve piston (30). The orifice plate has smaller orifices (48) for further restricting fluid flow through the valve body. The first stage piston is loaded by a spring (38) defining a first range of incoming fluid pressure and the reference pressure on the second stage valve piston defines a second range of incoming fluid pressure to provide a distinct multi-level range of regulating pressures.

10 Claims, 2 Drawing Sheets

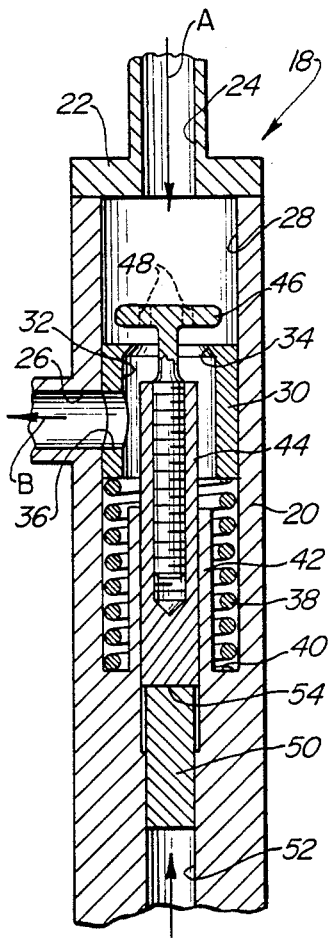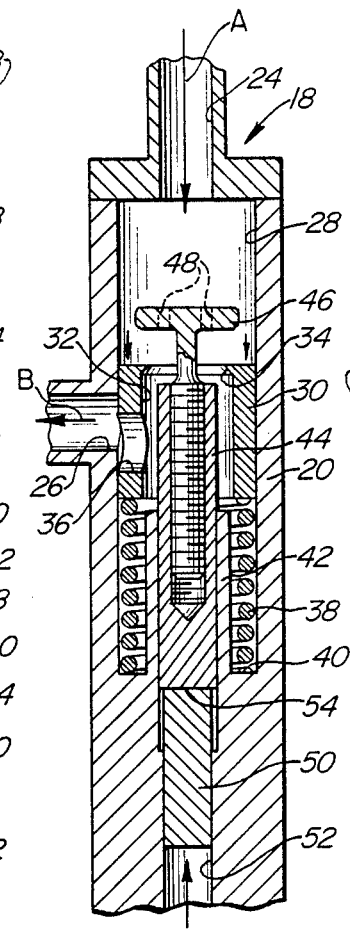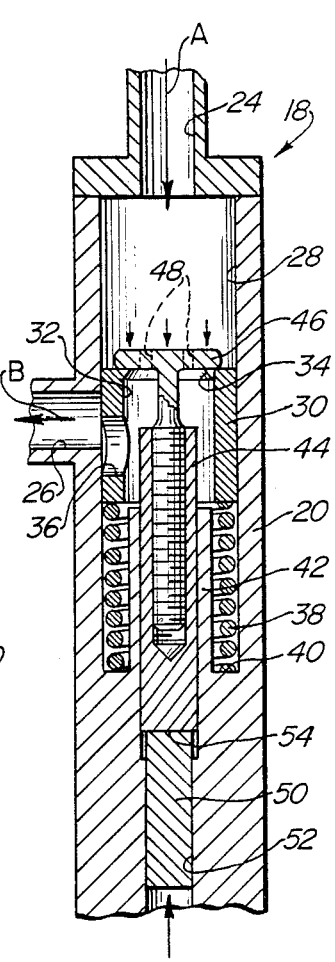

MULTI-STAGE FLOW REGULATING VALVE

FIELD OF THE INVENTION

This invention generally relates to flow regulating valve constructions and, particularly, to a multi-stage flow regulating valve particularly applicable to actuation systems, such as in aircraft or aerospace applications.

BACKGROUND OF THE INVENTION

Most all aircraft have various actuation systems used to operate doors, control surfaces and the like, such as a control flap on a wing. Such actuation systems may have a variable displacement hydromechanical drive means, such as a hydromechanical motor which uses a variable swashplate or wobbler plate which varies the piston displacement of the motor. Heretofore, a single stage flow regulating valve typically was used to control motor speed, but such valves allow the motor to overspeed and/or oscillate when subjected to aiding loads. To control overspeed and/or oscillation due to any aiding loads, mechanical provisions have been used to lock the swashplate in some fixed displacement position. The drawback to such mechanical means is that additional hardware must be provided for latching the swashplate.

In aerospace applications, weight and packaging parameters are quite critical. Whenever any mechanical means, such as locking devices, must be added in any system of the craft, additional weight and packaging requirements necessarily result.

This invention is directed to solving the problem of controlling overspeed or other undesirable characteristics of a motor in a variable displacement hydromechanical actuation system without additional mechanical hardware in order to maintain low weight and size parameters for the system. This is accomplished by a compact multi-stage flow regulating valve which controls motor speed for opposing, no-load and aiding load conditions to obviate mechanical latching or other such control means for the motor.

SUMMARY OF THE INVENTION

An object, therefore, of the invention is to provide a new and improved multi-stage flow regulating valve for controlling motor speed, such as in a variable displacement hydromechanical actuation system.

Generally, the valve includes a first stage for controlling motor speed for no-load and opposing load conditions, and a second stage for controlling motor speed while under aiding loads. For purposes herein, at least in the context of a control surface of an aircraft, an opposing load may be such as against positive air pressure, an aiding load would be in the direction of positive air pressure, and no-load would be akin to the craft being on the ground.

More specifically, in the exemplary embodiment of the invention, the multi-stage flow regulating valve generally includes a valve body having a fluid inlet and a fluid outlet defining a fluid flow path through the valve body. A first stage valve member is mounted for relative movement in the valve body in the flow path between the inlet and the outlet for restricting fluid flow in response to a first range of incoming fluid pressure. A second stage valve member is provided in the valve body in the flow path and operatively associated with the first valve member for restricting fluid flow in response to a second range of incoming fluid pressure beyond the first range.

As disclosed herein, the valve body is defined by a cylinder having an inlet port at one end and a side outlet port. The first stage valve member is formed by a piston in the cylinder, with a through port in registry with the outlet port of the valve body, whereby movement of the first stage piston varies that registry to vary fluid flow through the ports. The second stage valve member is provided by another piston-like member reciprocally mounted within the first stage piston. The second stage piston has an orifice plate for closing an orifice of the through port in the first stage piston.

The first stage piston is spring loaded by a spring which defines the first range of incoming fluid pressure to be regulated thereby. The second stage piston is biased by fluid pressure means which defines the second range of fluid pressure beyond the first range.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an axial section through the multi-stage flow regulating valve of the invention;

FIG. 3 is a view similar to that of FIG. 2, with the first stage valve piston moved downwardly in response to incoming fluid pressure;

FIG. 4 is a view similar to that of FIGS. 2 and 3, with the second stage valve member moved downwardly relative to the first stage valve member.

DETAILED DESCRIPTION OF THE PREFERRED EMBODIMENT

Figure 1:
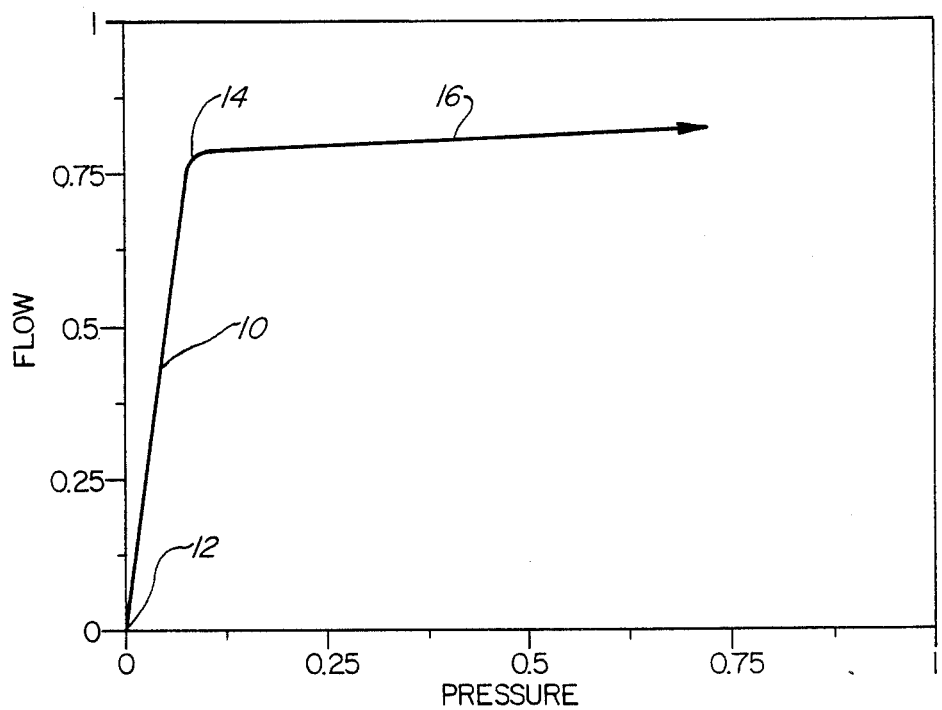
FIG. 1 is a graph showing the performance of a single stage flow regulating valve typically used in variable displacement hydromechanical actuation systems.

Referring to the drawings in greater detail, FIG. 1 shows a graph of the performance of a typical flow limiter such as a single stage flow regulating valve which might be used to control motor speed in a variable displacement hydromechanical actuation system. Reference will be made back to this graph hereinafter, but it initially should be understood that such valves conventionally have a spring loaded piston which must be overcome by incoming fluid pressure.

Specifically, incoming fluid pressure will move the valve piston fairly rapidly as indicated by the steep line portion 10, beginning at a static position 12. Increasing fluid flow through the valve causes a corresponding increasing pressure drop across the valve orifice until the valve has overcome the preload of its biasing spring force, as at transition point 14. From this point on, as indicated by line portion 16 of the graph, the valve is in a regulation mode for the hydromechanical motor and, preferably, is substantially constant.

The graph of FIG. 1 shows the typical operation of a single stage flow regulating valve or flow limiter, as stated. However, should the hydromechanical actuation system within which the valve is used encounter an aiding load, such as an aiding load caused by a control surface of an aircraft being moved in the direction of positive air pressure, the motor is allowed to overspeed and/or oscillate. As stated above, in order to prevent such an undesirable condition, heretofore some form of mechanical provisions have been made to lock the motor, such as locking the swashplate of a variable piston displacement hydromechanical motor. This invention is directed to a control system which eliminates such additional hardware.

Referring to FIG. 2, a multi-stage flow regulating valve according to the concepts of the invention is shown and generally designated 18. The valve includes a valve body 20 including a top closure cap 22 forming a fluid inlet 24. A fluid outlet 26 is provided in the side of the valve body whereby a fluid flow path is defined through the body, as indicated by arrow "A" through inlet 24 and out through outlet 26 as indicated by arrow "B". The valve body defines a cylinder 28 therewithin.

A first stage valve member in the form of a valve spool or piston 30 is reciprocally mounted within cylinder 28 of valve body 20. The first stage valve member or piston 30 has a through port 32, including an inlet orifice 34 and an outlet port 36. It can be seen that inlet orifice 34 opens upwardly toward inlet 24 of the valve body, and outlet port 36 is in registry with outlet 26 of the valve body. Therefore, it can be understood that fluid flow regulation through the valve body can be achieved by the degree of registry of outlet port 36 of the first stage piston with outlet 26 of the valve body.

First stage piston 30 is spring-loaded by a coil spring 38 sandwiched between the underside of the piston and an interior shoulder 40 at the bottom of cylinder 28. The valve body has an upwardly protruding hollow boss or hub 42 projecting within the coil spring. Therefore, it can be understood that spring 38 defines the first stage preload on first stage valve member or piston 30, opposing the pressure of incoming fluid through inlet 24. This is indicative of a single stage flow regulating valve typically used in the prior art, and correlates with the performance graph of FIG. 1, whereby the incoming fluid pressure moves the piston downwardly in the direction of arrow "B" during the portion of the graph described at 10, above, until the piston has moved sufficiently to overcome the preload of spring 38, as represented by transition point 14 in FIG. 1.

At this point, valve 18 is in the condition as shown in FIG. 3. It can be seen that outlet port 36 in first stage valve piston 30 now is somewhat out of registry with outlet 26 through the side of valve body 20. During this condition, the first stage piston will regulate fluid flow through the valve in a conventional manner as represented by line portion 16 in the graph of FIG. 1. In other words, the condition of the valve in FIG. 2 would correspond to the static condition 12 in FIG. 1, with the incoming fluid flow or pressure moving the valve downwardly to point 14 whereupon the preload of spring 38 is overcome, and the valve piston thereafter continues to regulate the fluid flow responsive to changes in pressure across orifice 34.

However, should the particular mechanism with which the valve is used in the system be subjected to an aiding load, such as an aircraft control surface moving in the direction of positive air pressure, some form of locking provision must be made to hold the associated motor or else the motor will overspeed and/or oscillate with the control surface.

This invention overcomes the necessity of additional locking hardware by incorporating a second stage valve member in direct operative association with first stage valve member or piston 30. More particularly, a second stage piston 44 is reciprocally mounted within hub 42 and projects upwardly through port 32 in first stage piston 30. The upper distal end of second stage piston 44 includes an orifice plate 46 having orifices 48. These orifices are in positional registry with inlet orifice 34 at the top of first stage piston 30. Therefore, it can be understood that with an increasing fluid pressure of incoming fluid through inlet port 24 of valve body 20, second stage piston 44 and its orifice plate 46 can be driven downwardly if the piston is loaded by a reference pressure whose resultant force on the piston is less than the load applied due to the pressure of the incoming fluid and the load of coil spring 38 on first stage piston 30. To this end, a reference spool 50 is located in a small internal cylinder 52 in valve body 20 at the base of larger cylinder 28. Any form of fluid pressure means (not shown) can be used to apply a reference pressure to reference spool 50 Alternatively, the reference pressure could be applied directly to the bottom 54 of second stage piston 44. In addition, a smaller, stiffer coil spring could be positioned in cylinder 52 in lieu of a fluid reference pressure. However, such a coil spring would have a fixed value and would not be adaptable as by an appropriate fluid pressure source.

FIG. 4 shows the condition wherein second stage piston 44 has moved downwardly in response to increasing incoming fluid pressure until orifice plate 46 completely covers orifice 34 in first stage piston 30, whereby orifices 48 in the orifice plate now are effective to further limit fluid flow through the valve body.

In reviewing the above sequence of structural-operational functioning of multi-stage flow regulating valve 18, it can be understood that initial incoming fluid pressure generates a force against the upper surface of first stage valve member or piston 30, causing the piston to move downwardly against the biasing force of spring 38. As this movement occurs, outlet port 26 in the valve body is partially blocked by the misalignment of outlet port 36 in the first stage piston and outlet 26 in the valve body. This flow restriction creates a pressure in the incoming fluid which is relatively higher than the reference pressure on reference spool 50 and second stage piston 44. This increased pressure differential resulting from the partial blockage of outlet port 26 creates a net downward force on orifice plate 46 of second stage piston 44. This additional force moves second stage piston 44 downwardly against the top of first stage piston 30 and exerts even a greater force downwardly moving orifice plate 46 against spring 38. This increased downward force moves first stage piston 30 further downwardly and provides additional blockage of outlet port 26.

In the context of a motor being subject to aiding loads, the motor will be backdriven and actually operate as a pump under aiding load conditions. This backdriving induces high pressures in the line feeding valve 18, i.e. inlet 24 to the valve body. When the pressure becomes high enough, the second stage orifice plate 46 "actuates" and covers orifice 34 in first stage piston 30. At this point, all the fluid flow goes through the smaller second stage orifices 48. The additional force induced by the flow through the smaller orifices further compresses spring 38 to further reduce the "effective" size of outlet port 26, decreasing the original flow valve to a still lesser design value.

Figure 5:
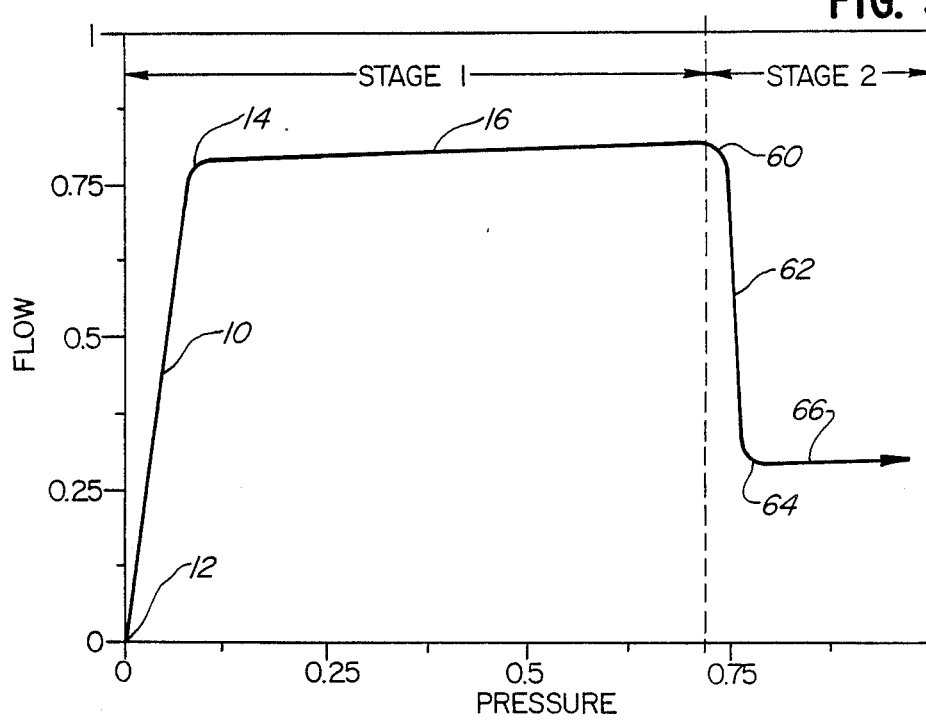
FIG. 5 is a graph showing the performance of the multi-stage flow regulating valve of the invention.

These flow performance characteristics are shown in the graph of FIG. 5. It can be seen that "Stage 1" is identical to that shown in the graph of FIG. 1, i.e. the performance of a single stage regulating valve or flow limiter. The right-hand portion of the graph, indicated "Stage 2" illustrates the enhanced performance afforded by the multistage flow regulating valve 18 of the invention. In other words, transition point 60 at the end of the previously described graph line portion 16, represents the point where the incoming fluid pressure overcomes the reference pressure on reference spool 50. Graph line portion 62 represents the movement of second stage valve piston 44 downwardly until orifice plate 46 cover orifice 34 in first stage piston 30, this being represented by the transition point 64 in the graph. Line portion 66 represents the performance of the valve, now operating at a different regulating pressure through the means of spring 38. In other words, spring 38 still controls the regulating function of the valve, but the first stage valve piston 30 has been moved downwardly to a different pressure range through the operation of second stage piston 44 and its orifice plate 46 with flow restricting orifices 48.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A multi-stage flow regulating valve, comprising:
    a valve body having a fluid inlet and a fluid outlet defining a fluid flow path through the valve body;
    a first stage valve member mounted for relative movement in the valve body in the flow path between the inlet and the outlet for restricting fluid flow in response to a first range of incoming fluid pressure;
    first biasing means of a first value for biasing the first stage valve member against the incoming fluid pressure and defining said first range of incoming fluid pressure;
    a second stage valve member in the valve body in said flow path and operatively associated with the first valve member for restricting fluid flow in response to a second range of incoming fluid pressure beyond said first range; and
    second biasing means of a second value for biasing the second stage valve member against the incoming fluid pressure defining said second range of incoming fluid pressure.

2. The multi-stage flow regulating valve of claim 1 wherein said first biasing means comprises spring means.

3. The multi-stage flow regulating valve of claim 2 wherein said second biasing means comprises fluid pressure means.

4. A multi-stage flow regulating valve, comprising:
    a valve body defining a cylindrical fluid flow cavity, a fluid inlet to the cavity and a fluid outlet from the cavity, the fluid outlet comprising an outlet port in a side of the cylindrical cavity;
    a valve spool reciprocally mounted in the cavity between the inlet and the outlet for restricting fluid flow through the valve body in response to a first range of incoming fluid pressure, the valve spool having a through passage for the fluid, the valve spool having a flow passage therethrough and a through port in registry with the outlet port whereby movement of the valve spool in the cavity varies said registry to vary fluid flow through the ports, the through passage in the valve spool having a valve orifice remote from the through port;
    a second stage valve member reciprocally mounted on the valve spool for restricting fluid flow through said through passage in response to a second range of incoming fluid pressure beyond said first range, the second stage valve member comprising an orifice plate for closing and opening said valve orifice; and
    biasing means for biasing the second stage valve member against the incoming fluid pressure and defining said second range of incoming fluid pressure.

5. The multi-stage flow regulating valve of claim 4 wherein said second biasing means comprises fluid pressure means.

6. A multi-stage flow regulating valve, comprising:
    a valve body defining a cylindrical fluid flow cavity, a fluid inlet to the cavity and a fluid outlet from the cavity, the fluid outlet comprising an outlet portion in a side of the cylindrical cavity;
    a valve spool in the form of a first piston reciprocally mounted in the cavity between the inlet and the outlet for restricting fluid flow through the valve body in response to a first range of incoming fluid pressure, the first piston having a fluid flow passage therethrough with a side port at one end of the passage for registry with the outlet port and a valve orifice exposed to incoming fluid pressure at an opposite end of the passage; and
    a second stage valve member in the form of a second piston reciprocally mounted within the first piston for restricting fluid flow through the fluid flow passage through the first piston in response to a second range of incoming fluid pressure beyond said first range, the second piston including an orifice plate for closing and opening said valve orifice.

7. The multi-stage flow regulating valve of claim 6 wherein said orifice plate has orifice means smaller than the valve orifice in the first stage valve member.

8. The multi-stage flow regulating valve of claim 6 wherein said first piston is spring loaded on a side thereof opposite the fluid inlet and defining said first range of incoming fluid pressure.

9. The multi-stage flow regulating valve of claim 8, including biasing means for biasing the second piston against the incoming fluid pressure and defining said second range of incoming fluid pressure.

10. The multi-stage flow regulating valve of claim 9 wherein said biasing means comprises fluid pressure means.

* * * * *